US005921436A

United States Patent [19]

Lowing

[11] Patent Number: 5,921,436

[45] Date of Patent: Jul. 13, 1999

[54] MEDIA DISPENSING MACHINE

[76] Inventor: C. Rankin Lowing, 2370-G Hillcrest Rd., Box 205, Mobile, Ala. 36695

[21] Appl. No.: 08/831,737

[22] Filed: Apr. 1, 1997

Related U.S. Application Data

[63] Continuation-in-part of application No. 08/727,946, Oct. 9, 1996, which is a continuation-in-part of application No. 08/623,998, Mar. 29, 1996.

[51] Int. Cl.[6] .................. B65G 59/00

[52] U.S. Cl. .................. 221/279; 221/195

[58] Field of Search .................. 221/279, 280, 221/195, 258, 75, 6

[56] References Cited

U.S. PATENT DOCUMENTS

| | | | |
|---|---|---|---|
| 187,252 | 2/1877 | Brice | 221/279 |
| 2,137,490 | 11/1938 | Harvey | 312/57 |
| 2,800,251 | 7/1957 | Abendschein | 221/211 |
| 2,876,884 | 3/1959 | Ray | 194/10 |
| 3,685,691 | 8/1972 | Charest | 221/225 |
| 3,908,859 | 9/1975 | Hohmann | 221/279 |
| 4,061,245 | 12/1977 | Lotspeich | 221/75 |
| 4,298,140 | 11/1981 | Owens | 221/232 |
| 4,473,172 | 9/1984 | Reynolds | 221/213 |
| 4,770,321 | 9/1988 | Anderson | 221/100 |
| 4,821,916 | 4/1989 | Dewaele | 221/13 |
| 5,305,913 | 4/1994 | Shade | 221/226 |
| 5,373,963 | 12/1994 | Hsu | 221/17 |
| 5,400,919 | 3/1995 | Gomm | 221/195 |

FOREIGN PATENT DOCUMENTS

| | | | |
|---|---|---|---|
| 0581076 | 2/1994 | European Pat. Off. | G07F 11/42 |
| 0685827 | 12/1995 | European Pat. Off. | G07F 11/04 |
| 1285942 | 12/1968 | Germany | 221/279 |
| 2117786 | 10/1972 | Germany | G07F 11/42 |

*Primary Examiner*—H. Grant Skaggs

*Attorney, Agent, or Firm*—Keaty & Keaty

[57] ABSTRACT

The invention relates to a vending machine for dispensing of a single copy of a printed publication, such a newspaper or a magazine. The vending machine has a metering brake mounted adjacent a dispensing channel for separating a single copy of a publication from a stack of publications that are retained in a housing of the vending machine. The metering brake allows to achieve a uniform speed of movement of both sides of the folded newspapers, or magazines moving along a bearing plate and effective separation of the single copy from the stack of papers.

3 Claims, 3 Drawing Sheets

MEDIA DISPENSING MACHINE

CROSS REFERENCE TO RELATED APPLICATIONS

This application is a continuation-in-part of my co-pending application Ser. No. 727,946 filed on Oct. 9, 1996, which is a continuation-in-part of my co-pending application Ser. No. 623,998 filed on Mar. 29, 1996, entitled "Dispensing Machine for Newspapers and Magazines," the full disclosures of which are incorporated by reference herein.

BACKGROUND OF THE INVENTION

The present invention relates to media dispensing machines, and more particularly to a machine for dispensing printed publications, such as newspapers, magazines and the like.

Newspaper and magazine dispensing machines are conventionally positioned in public areas, on busy street corners, in lobbies of public buildings and other similar locations in order to maximize exposure of the printed publications to the purchasing public. Generally, such newspaper and magazine dispensing machines are provided with a hollow housing with a pivotally connected front door that opens in response to deposit of the necessary amount of coins into a specially provided slot. The deposit of coins releases the latch mechanism that normally keeps the front door closed, allowing the buyer to pull the front door and gain access to the inventory of the publications stacked inside the housing.

Such design suffers from major drawbacks, one of which is easy accessibility by a paying customer to the entire inventory of newspapers or magazines. For example, a buyer who deposited the correct amount of money to buy one such publication can easily remove the entire inventory retained in the housing, thus depriving the vending machine operator from obtaining payment for the rest of the newspapers or magazines. Considerable commercial losses are suffered by many vending machine operators due to theft of publications from such conventional vending machines.

To solve this problem, various designs in vending machines were suggested. The main object of these designs is to restrict access of the public to the entire inventory of the printed publications located in the housing of the vending machine. One such design is shown in U.S. Pat. No. 5,400,919 issued on Mar. 28, 1995. In accordance with that patent, folded newspapers are advanced along an inclined platform by a push plate which supports a stack of folded newspapers. Individual copies of the newspaper are advanced to a vending position by operation of a roller which engages the foremost single copy and brings it into alignment with a hopper plate descending downwardly from the platform. After a customer pays for a copy of the newspaper, a single copy is allowed to fall through the hopper to an access slot for recovery by the customer. A sensor positioned in the hopper wall sends a signal to a control mechanism to allow activation of the roller and depositing of the next copy into the ready-to-vend position when the next customer can retrieve a copy after the trap door opens.

Such a design, while being an improvement over prior designs, still suffers from some disadvantages. For example, the trap door on which the fold of the newspaper rests while the newspaper is in the vending position, is located very close to the access opening, from which the newspaper is withdrawn by the buyer. Additionally, the entire inventory of the media units is positioned very close to the vending position. The design in accordance with the '919 patent requires provision of a special bailer which acts in combination with a cam/step motor unit to retain the forwardmost newspaper copy in a generally vertical orientation.

My co-pending applications solve the problem of one copy dispensing by providing a metering brake that is mounted on a bearing plate holding the publications in an upright position, thereby allowing only one copy of the publication to advance to a ready-to-vend position. While the designs in accordance with my co-pending applications tested satisfactory in the majority of cases, it was discovered that particularly thin newspapers, typically Thursday newspapers that contain only 20 or so pages, and multiple advertising inserts have a tendency of advancing at an uneven speed along the bearing plate.

For example, one edge of the newspaper would contact one of the metering brakes located adjacent the edge of the bearing plate and contact that metering brake, while movement of an opposite edge of the newspaper that contacts the opposite metering brake tends to slow down. This was considered not satisfactory for some of the particularly thin publications. The present invention contemplates elimination of drawbacks associated with prior designs and provision of an improved media unit dispensing machine suitable for dispensing newspapers or magazines, regardless of their thickness, one copy at a time.

SUMMARY OF THE INVENTION

It is, therefore, an object of the present invention to provide a media vending machine for dispensing a single copy of a printed publication, one copy at a time.

It is another object of the present invention to provide a media dispensing apparatus with an improved metering brake that allows to effectively separate the forwardmost copy of the publication for dispensing, while retaining the remainder of the inventory within the housing in a ready-to-vend position.

These and other objects of the present invention are achieved through a provision of a media dispensing machine which comprises an apparatus for dispensing media units, one copy at a time. The vending machine has a hollow housing within which an inclined bearing plate is secured. A plurality of media units, such as newspapers, or magazines are supported by the bearing plate in an upright position. A push plate slidably moves along the bearing plate, in response to a signal received from a coin receiving assembly, moving the media units forward along the bearing plate to a leading dispensing edge of the bearing plate.

A metering brake is mounted in a central recess, or cutout formed in the leading dispensing edge of the bearing plate. The metering brake has a curved forward edge that facilitates uniform speed of movement of both sides of a folded newspapers along the bearing plate and into the dispensing channel formed adjacent to the leading dispensing edge of the bearing plate.

The curvature of the forward edge of the metering brake can differ, preferably having a radius of between nine to twelve inches. This radius was selected as it demonstrated good results in tests involving particularly thin publications.

The top surface of the metering brake is inclined at an obtuse angle upwardly in relation to a top surface of the bearing plate. The distant edge of the metering brake is slightly lower than the top leading dispensing edge of the bearing plate, further facilitating separation of a single copy from a stack of units placed on the bearing plate. The angle of incline can differ, in some applications it was found that a nine to eleven degree slope produces a satisfactory result.

The bottom surface of the metering brake rests on a bracket which is mounted below the bearing plate and extends forwardly therefrom. The support bracket is secured to the bearing plate and to an internal bulkhead mounted in the housing.

The apparatus is provided with a means for advancing the stacked publications along the bearing plate. A push plate is connected to a gear motor which responds to a signal received from a control unit. The control unit, in turn, is activated when the correct amount of payment is made into the dispensing machine.

BRIEF DESCRIPTION OF THE DRAWINGS

Reference will now be made to the drawings, wherein like parts are designated by like numerals, and wherein.

DETAIL DESCRIPTION OF THE PREFERRED EMBODIMENT

Figure 1:
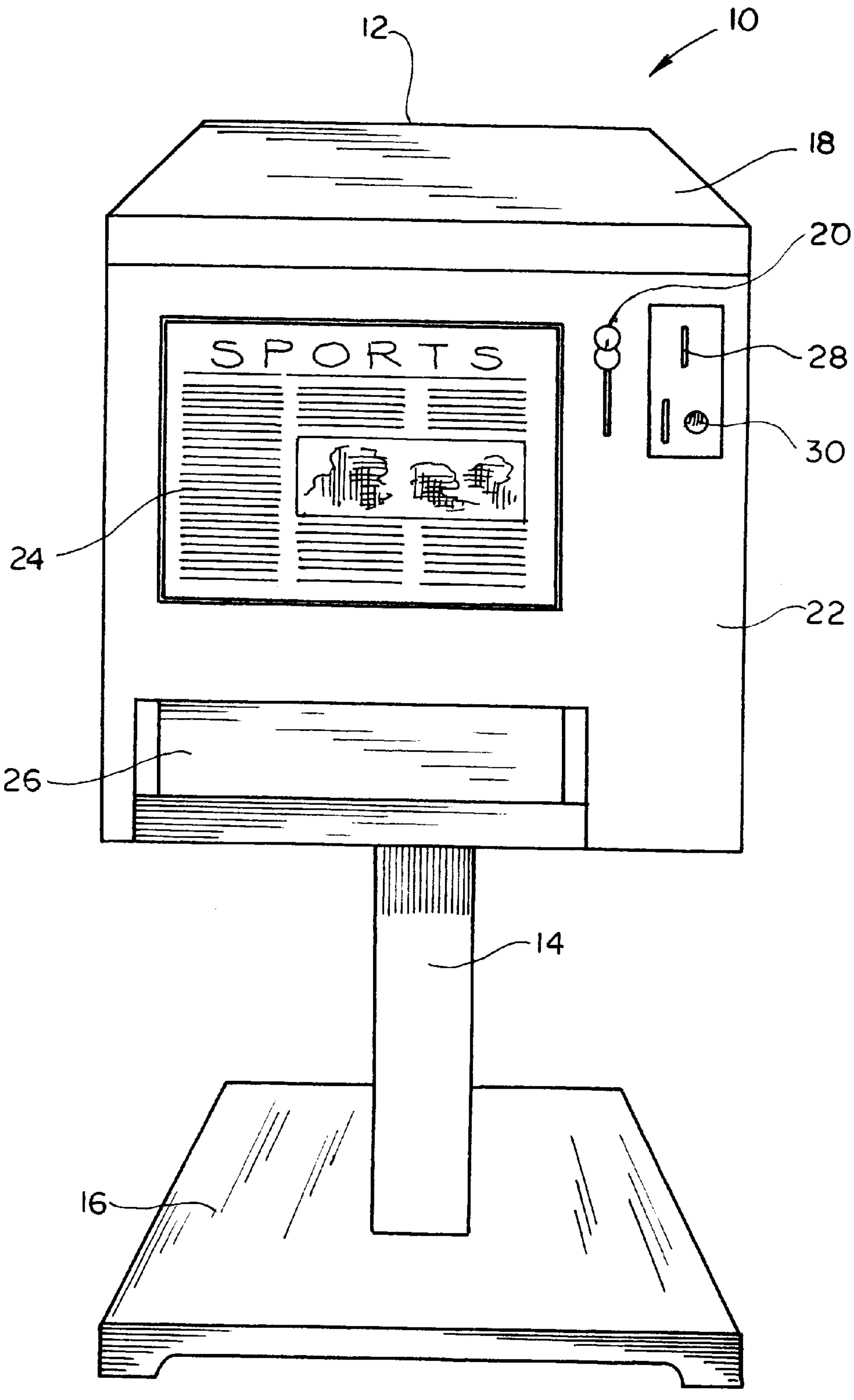
FIG. 1 is a perspective view of a media dispensing machine in accordance with the present invention.

Referring now to the drawings in more detail, numeral 10 designates a vending machine in accordance with the present invention. The apparatus 10 comprises a hollow housing 12 supported by a pedestal 14 on a horizontal weighted base 16. The housing wall has a generally rectangular configuration, defined by a closed bottom, closed side walls and a hinged top access door 18. The access door is locked in its closed position by a suitable lock and key mechanism 20 located on the front wall 22 of the housing 12.

The front wall 22 is provided with a transparent display window 24 preferably made of a strong, shatter-proof material, behind which a displayed copy of a publication, such as a newspaper or magazine, is positioned. The window 24 allows a buyer to view the title of the publication retained in the vending machine 10 and ascertain the availability of a publication for purchase.

Below the display window 24 is a dispensing opening 26 that allows a buyer to remove a purchased copy of the publication. The access opening 26 can be sized to correspond to the largest size publication to be stored in the housing 12 and is high enough to prevent damage or tearing of the copy being withdrawn from the opening 26.

On the front wall 22 is a coin receiving opening 28, into which a buyer drops the coins. The coins are received by a coin-counting mechanism positioned on the interior side of the wall 22. A return lever 30 is located below the opening 28 to allow the buyer to obtain return of the coins. Alternatively, a credit card acceptance mechanism can be used in lieu of the coin receiving opening 28 and the coin-counting mechanism. Such credit card payment mechanism can be conventional and forms no part of the present invention.

Figure 2:
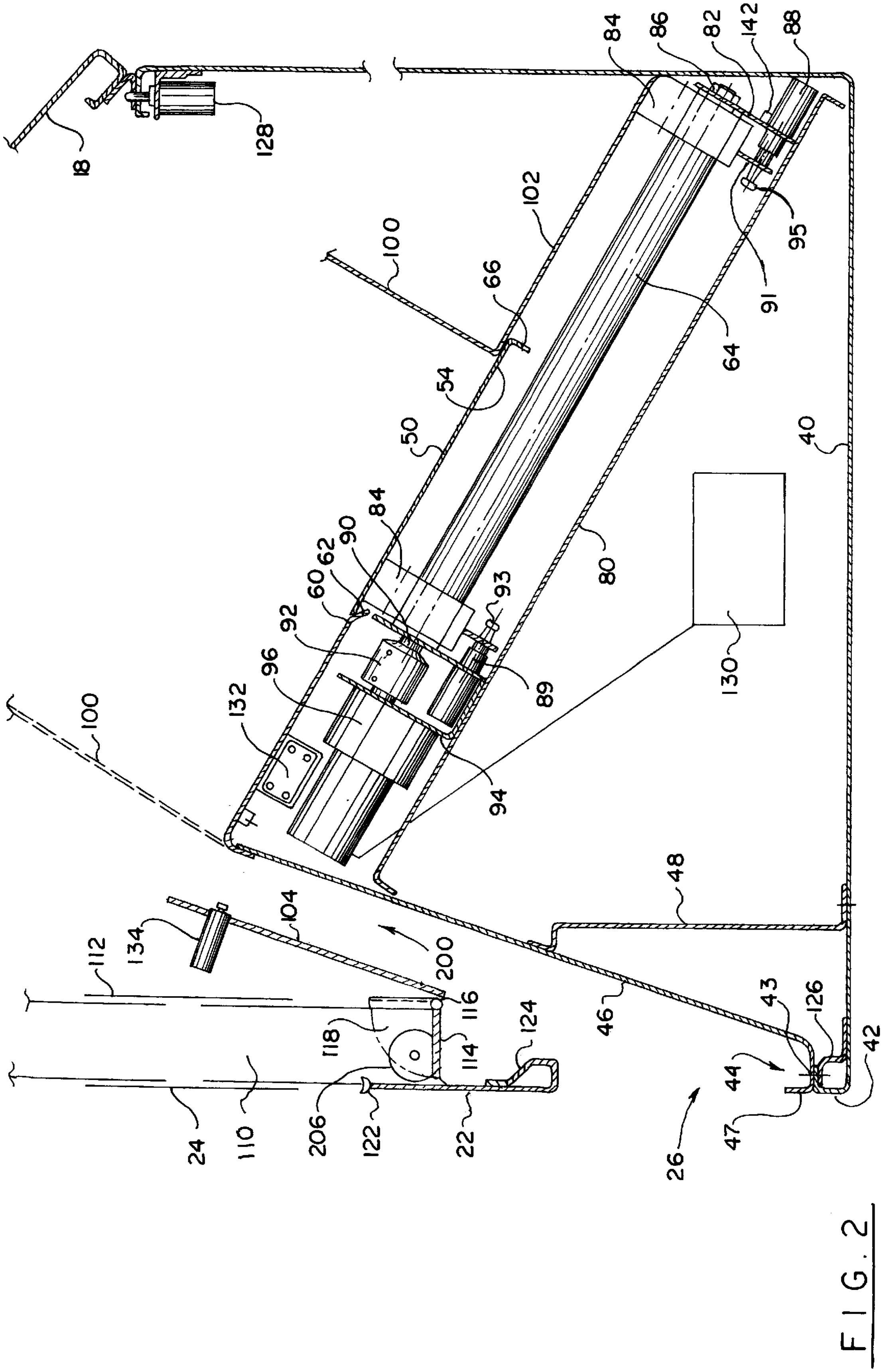
FIG. 2 is a schematic view of the operating mechanism of the vending machine in accordance with the present invention.

Turning now to FIG. 2 of the drawings, the operation of the vending machine 10 will be described in more detail. As can be seen in FIG. 2, a bottom wall 40 extends through substantially the entire housing 12 and carries a transversely oriented lip 42 at a forwardmost edge thereof A dispensing pocket 44 is formed by an inclined plate 46, along which a copy of the publication slides by gravity into the dispensing pocket 44. One end 47 of the plate 46 is bent upward to allow the publication to remain in the pocket 44 until withdrawn by a buyer. The plate 46 is secured to the bottom wall 40 by a bolt, or rivet 43.

Securely attached to the bottom plate 40 is an outwardly, vertically extending inner wall 48 which carries a platform, or bearing plate 50 at its upper end. The plate 50 is comprised of a solid plate with a central cutout 52 in its distant end 54. The forward portion of the platform plate 50 is secured to a support bracket 56 mounted under the bearing plate 50, as shown on FIG. 4. A suitable securing means, such as welding, and the like can be used to attach the bearing plate 50 to the bracket 56, as schematically shown at 57 in FIG. 4. The bracket 56 extends forwardly from a leading edge 68 of the bearing plate 50 and is secured to the inclined plate 46 by a similar means, as schematically shown at 47 in FIG. 4.

The cutout in the distant end 54 is provided with a turned down lip 62. The size of the cutout 52 allows movement of a nut 84 therein. The distant end 54 of the plate 50 is provided with a downwardly turned flange 66 which extends at a right angle to the top surface 58 of the plate 50.

Figure 3:
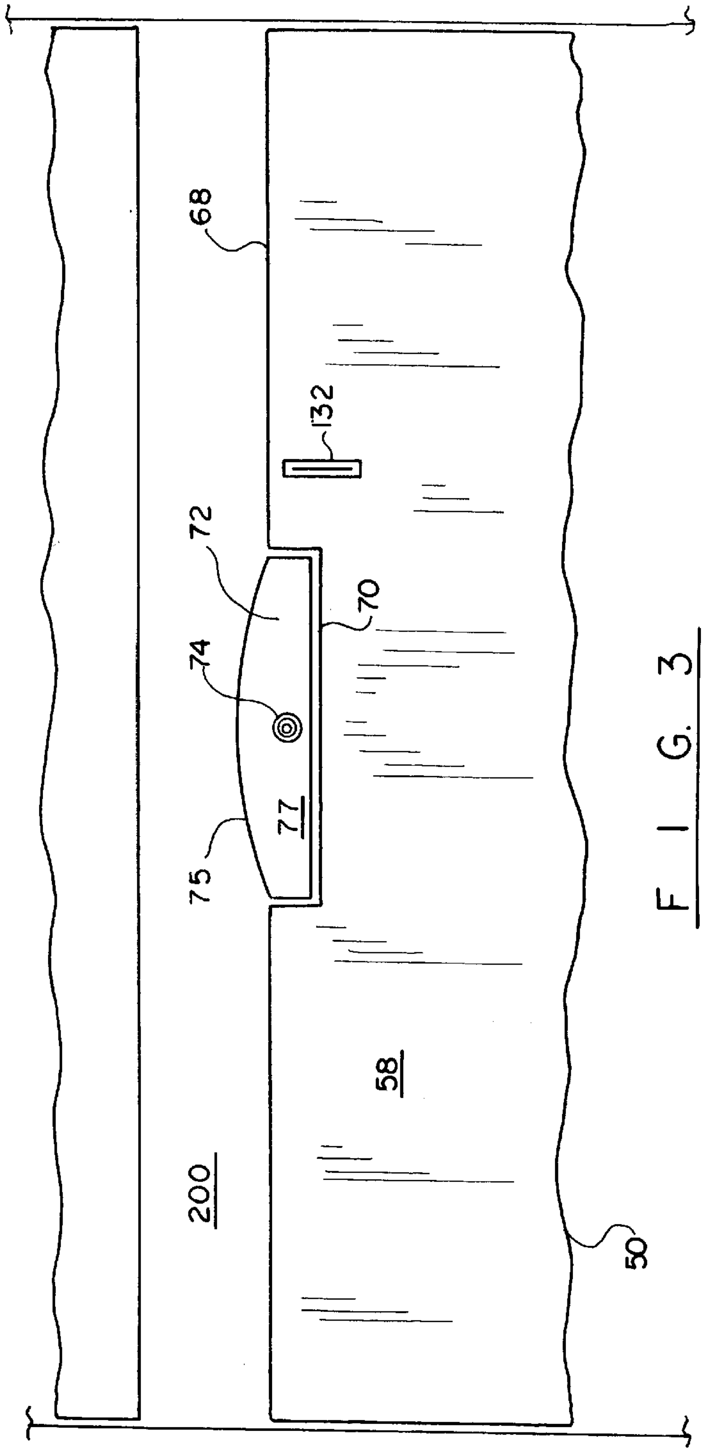
FIG. 3 is a detail top view of the metering brake in accordance with the present invention as secured on the bearing plate.
Figure 4:
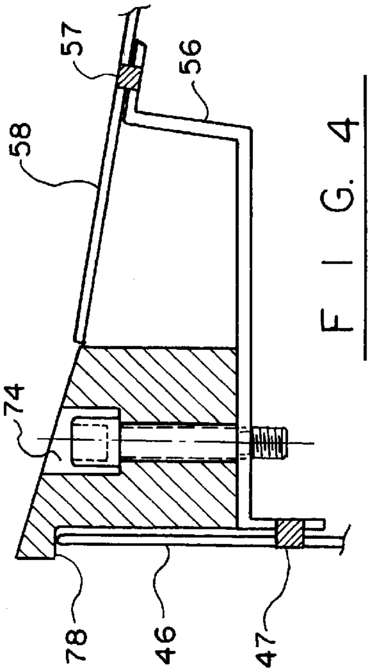
FIG. 4 is a detail, partially cross sectional view showing the metering brake as mounted adjacent the bearing plate in the vending machine of the present invention.

Turning now to FIGS. 3 and 4, the leading edge 68 of the platform 50 is shown provided with a central cutout, or recess 70 which is sized and shaped to accommodate at least a portion of a single metering brake 72. The metering brake 72 is secured to the angular bracket 56 by a suitable securing means, such as a bolt 73 fitted into an opening 74 formed through the body of the metering brake 72. The metering brake 72 is provided with an arcuate leading edge 75 extending forwardly from the leading edge 68 of the bearing plate 50.

A distant end 76 of the metering brake 72 is spaced lower than the leading edge 68, facilitating separation of the forwardmost newspaper from the stack of advanced newspapers, as will be described in more detail hereinafter. The radius of the leading edge 75 can differ to facilitate separation of the newspapers. In one of the embodiments, it was noted that a radius of nine to twelve inches demonstrated satisfactory test results. However, this radius can be changed, and the above values are not intended to be limitations on the radius.

The top surface 77 of the metering brake 72 is oriented at an obtuse angle in relation to the upper surface 58 of the bearing plate 50. The slope of the surface 77 can be relatively steep, in the order of 10–12 degrees, thereby further facilitating separation of the forwardmost newspaper from the stack of advanced newspapers, while retaining the remainder of the inventory on the bearing plate 50. Of course, other degrees of slope can be employed if desired.

A centrally located metering brake demonstrated that uniform speed of both sides of a newspaper can be achieved even if the newspaper has many pages of advertising inserts. As a result, the entire folded edge of the newspaper clears the bearing plate 50 almost simultaneously.

As can be seen in FIG. 4, the bottom of the leading edge 75 forms a shoulder 78 which rests on top of the wall 46, supporting the metering brake 72 above a dispensing chute 200.

It is preferred that the top surface 77 of the metering brake 72 be made as smooth as possible. For example, if the metering brake 72 is made from a solid piece of metal, the surface 77 can be polished allowing a smooth travel of the forwardmost paper along the surface 77 with an even, uniform speed. Regardless of the thickness of the newspaper, or the amount of advertising inserts placed closer to one side of the newspaper, the metering brake 72 allows separation of a single copy of the publication from the remainder of the stack moving along the top surface 58 of the bearing plate 50.

Mounted in a substantially parallel relationship to the platform 50 is a motor deck 80 (see FIG. 2) which supports an operational portion of the publication advancing mechanism. A bracket 82 is fixedly attached to the deck 80 at its distant end, the bracket 82 extending at a right angle outwardly from the top surface of the deck 80. A lead screw bushing 86 surrounds the distant end of the lead screw 64 and allows securing thereof to the bracket 82. An opposite end of the lead screw 64 carries a bushing 90 and a coupling 92 which allows securing of that end of the lead screw 64 within a motor supporting bracket 94.

A limit switch 88 is mounted on the deck 80 adjacent the lead screw bushing 86. A similar limit switch 89 is mounted on the deck 80 at a location which the nut 84 reaches when the last copy of a publication resting on the platform 50 is being dispensed. Each limit switch 88 and 89 is activated by downwardly extending tang 91 when the lead screw 64 rotates. The tang 91 is carried by the nut 84 and is fixedly secured thereto by suitable means, such as welding or the like. The tang 91 can be provided with adjusting screws 93 and 95 for the limit switches 88 and 89. The adjusting screws allow to control the time and position when the limit switches 88 and 89 become activated by contact with the tang 91.

A gear motor 96, schematically illustrated in FIG. 2, is operationally connected to the lead screw 64 and the coupling 92.

A push plate 100 extends at a right angle to the support plate 50, the push plate 100 being adapted for pushing the publication copies along the top surface 58 of the bearing plate 50 from a distant end 54 thereof toward the dispensing edge 68. The push plate 100 has a bottom portion 102 which extends in a parallel relationship to the bearing plate 50 to a distance sufficient to clear the metering brake 72. The horizontal portion 102 is connected, through the nut 84, to the lead screw 64 and facilitates advancement of the push plate 100 during operation of the vending machine.

The push plate 100 moves to a position shown in phantom lines in FIG. 2, and the printed publications that rest on the top surface 58 of the plate 50 are moved toward the dispensing edge 68.

The dispensing chute 200 which allows dispensing of the advanced printed publications into the dispensing pocket 44 us a four-sided enclosure which is defined, in part, by the wall 46 and a second wall 104 that is oriented in a substantially parallel relationship to the wall 46 and is secured to the side walls of the housing 12 by suitable means, such as spot welding. Of course, other means of securing the wall 104 can be employed, if desired.

Mounted behind the display window 24 is a display copy pocket 110 which comprises a vertically oriented back plate 112 secured in a substantially parallel relationship to the display window 24, and a trap door 114 which is pivotly mounted in a transverse relationship to the back plate 112. The trap door 114 pivots or swivels about a pivot point 116.

A solenoid 206 (schematically shown in FIG. 2) is operationally connected to a return plate 118 of the trap door 114. When the solenoid 206 is activated by a central control means, signaling that the entire inventory of the publications resting on the platform plate 50 has been dispensed, the trap door return plate 118 becomes disengaged from the solenoid 206, allowing the trap door 114 to drop by pivoting about the pivot point 116, and the display copy of the publication drops by gravity, into the dispensing pocket 44. Normally, the trap door 114 is oriented horizontally, supporting the display copy behind the window 24.

Once the display copy descends into the dispensing pocket 44, it can be retrieved by the buyer through the dispensing opening 26. The solenoid 206 is again engaged with the return plate 118, and a "Sold Out" sign is displayed in the window 24.

The window 24 is securely connected to the front outside wall 22 of the housing 12, preferably without any screws or bolts. In a preferred embodiment, a resilient, flexible gasket 122 with corresponding slots, or cutouts is used for attachment of the window 24 to the front wall 22. If desired, a reinforcement member 124 can be secured to a lower part of the front wall 22, and another reinforcement member 126 can be secured to the upwardly turned lip 42 of the bottom plate 40.

The apparatus 10 of the present invention is provided with a number of limit switches that facilitate dispensing of the printed publications one at a time, while preventing theft of the newspapers and deterring vandalism. The first limit switch 128 is operationally connected to the access door 18. The switch 128 can be in the form of a mechanical limit switch to be located in the hinge of the access door. When the circuit of the access door limit switch is closed, the control unit 130, which is operationally connected to the motor 96 will send an activation signal to the motor and advance the push plate 100 to a ready-to-vend position.

A second limit switch 132 is mounted on the platform 50 adjacent the metering brake 72. The limit switch 132 responds to a contact with the publication which advanced along the platform plate 50 and reached the metering brake 72. Once the limit switch 132 is contacted by a lower folded edge of the publication that rests on the platform 50, the limit switch 132 sends a signal to the control unit 130 to stop advancement of the push plate 100 so that the publication is in a ready-to-vend position. The limit switch 132 can be a mechanical limit switch, or other suitable means for transmitting a signal to the control unit 130.

A third limit control switch 134 is a transducer that consists of two elements, a light emitting element and a light receiving element. The limit control switch 134 is mounted on the wall 104 adjacent the dispensing edge 68 of the platform 50. When a single publication drops down the chute 200, it will temporarily interrupt the light flow from the light emitting means to the light receiving means. A signal is transmitted to the control unit 130 where it is processed and sent to the gear motor 96. Of course, other types of control switches can be used. For example, a conventional inductive proximity sensor can be substituted for the optical transducer described above.

In response to the signal from the limit switch 134, the rotation of the motor shaft is reversed for a base period of time, for example 0.5 to 1.5 seconds, to reverse the direction of the movement of the push plate 100 and allow the remainder of the publications to move slightly back, away from the metering brake 72 on the platform plate 50. This movement relieves pressure on the forwardmost copy of the publication and, due to the inclined position of the platform plate 50 and the metering brake 72, prevents inadvertent dispensing of the next publication by gravity.

Another limit switch 89 is located near the extreme limits of travel of the push plate 100 and the support 102. The limit switch 89 is designed to stop advancement of the plate 100 toward the dispensing edge 68. Once the push plate 100 reaches its uppermost position, a signal is sent to the control unit 130 and to the gear motor 96 to stop rotation of the motor shaft. This causes the control unit 130 to momentarily direct power to the solenoid 206.

At that time, all publications resting on the bearing plate 50 have been dispensed, and the only copy left in the vending machine is the display copy behind the window 24. When activated, the solenoid 206 allows the trap door 114 to open by gravity and drop the last publication into the dispensing pocket 44. At this time, the control unit 130 reverses the gear motor 96 and lead screw 64 to return the push plate 100 to the original position.

The return of the push plate 100 to the original position will cause another limit switch 88 to be contacted by the bracket 82 and send a signal to the control unit 130 to remain inactive until the housing 12 is re-stocked by the vending machine operator. The switches 88 and 89 can be mechanical switches or other suitable means for sending a signal to the motor 96 to stop rotation of the shaft.

The apparatus 10 is provided with a coin counting mechanism which is located behind the coin receiving slot 28. The coin counting mechanism, not shown in the drawing, activates a limit switch 134 when the first coin is deposited into the slot 28. The coin counting mechanism activates the motor 96 as soon as the exact amount of money has been deposited into the vending machine. In response, the motor 96 causes advancement of the push plate 100 for dispensing of the forward copy of the publication. The control unit 130 can be provided with a manual override switch allowing to reset the apparatus 10 that would enable the electrical circuit to function in an event when anything less than a total sellout of the publications is present.

Although not shown in the drawings, a means for manually resetting the trap door 114 after sale of the display copy of the publication is also provided.

The metering brake 72, and its inclined top surface 77 make a particularly efficient theft deterrent means. Even if the vending machine 10 is tilted by a potential thief, the advanced copy of the publication will not move past the leading edge 75 or the metering brake 72 and will not allow dispensing of the publication without payment. As a result, the necessity for a means to block the dispensing chute 200 adjacent the leading edge 75 is eliminated.

Additionally, a tilt switch 136 mounted on the plate 104 can be connected to an audio alarm system (not shown) and positioned within the housing 12. When the vending machine 10 is tilted to a degree in access of that preset by the tilt switch 136, which can be a mercury-filled switch, an audible alarm produces a piercing sound which will help deter vandalism or theft of the publications or of the entire vending machine 10.

The apparatus 10 of the present invention prevents unauthorized access to the entire inventory of the housing 12 by allowing dispensing of the publication through a narrow chute 200 and preventing access to the remainder of the inventory contained in the housing 12. Additionally, the reverse movement of the push plate 100 after dispensing of one copy of the publication prevents undesirable vending of more than one copy of the publication in response to depositing of the amount of money for one copy only. Even further, return movement of the push plate 100 relieves pressure on the forwardmost copy of the publication resting on the bearing plate 50 and allows a vending machine operator to prevent loss of even a single copy.

The metering brake 72 being centrally located and having an arcuate forward edge, allows to effectively separate a single copy of the publication from the remainder of the copies resting on the plate 50. An upwardly inclined surface 77 of the metering brake 72 will further facilitate separation of a single copy for dispensing.

The vending machine 10 is self contained, and is powered by a battery (not shown) or by a solar powered unit which is incorporated into the operational system of the vending machine. As a result, the vending machine 10 can be positioned indoors or outdoors, away from sources of AC power to function independently even if municipal power supply is interrupted.

Many changes and modifications to the present invention will become apparent to those skilled in the art. I, therefore, pray that my rights to the present invention be limited only by the scope of the appended claims.

I claim:

1. A vending apparatus for dispensing a single copy of a media unit, comprising:

a bearing plate for supporting a plurality of media units in an upright position;

a push plate slidably movable along said bearing plate for advancing said plurality of media units to a leading dispensing edge of the bearing plate;

a dispensing channel formed adjacent said leading dispensing edge; and a means mounted between said leading dispensing edge and said dispensing channel for separating a single forward copy of said media unit prior to movement of the single copy into the dispensing channel, said separating means comprising a metering brake member mounted in a central recess formed in said leading dispensing edge, said metering brake member having an arcuate forward edge and a bottom surface resting on a support bracket mounted below said bearing plate.

2. The apparatus of claim 1, wherein said support bracket is secured to said bearing plate and extends forwardly therefrom.

3. An apparatus for dispensing a single copy of a media unit, comprising:

a bearing plate for supporting a plurality of media units in an upright position;

a push plate slidably movable along said bearing plate for advancing said plurality of media units to a leading dispensing edge of the bearing plate;

a dispensing channel formed adjacent said leading dispensing edge; and a means mounted between said leading dispensing edge and said dispensing channel for separating a single forward copy of said media unit prior to movement of the single copy into the dispensing channel, said separating means comprising a metering brake member mounted in a central recess formed in said leading dispensing edge, said metering brake member having an arcuate forward edge and and an inclined upper surface extending upwardly in relation to a top surface of the bearing plate, and wherein said metering brake member has a bottom surface resting on a support bracket mounted below said bearing plate, said support bracket being secured to said bearing plate and extending forwardly therefrom.

* * * * *